Patented Dec. 13, 1938

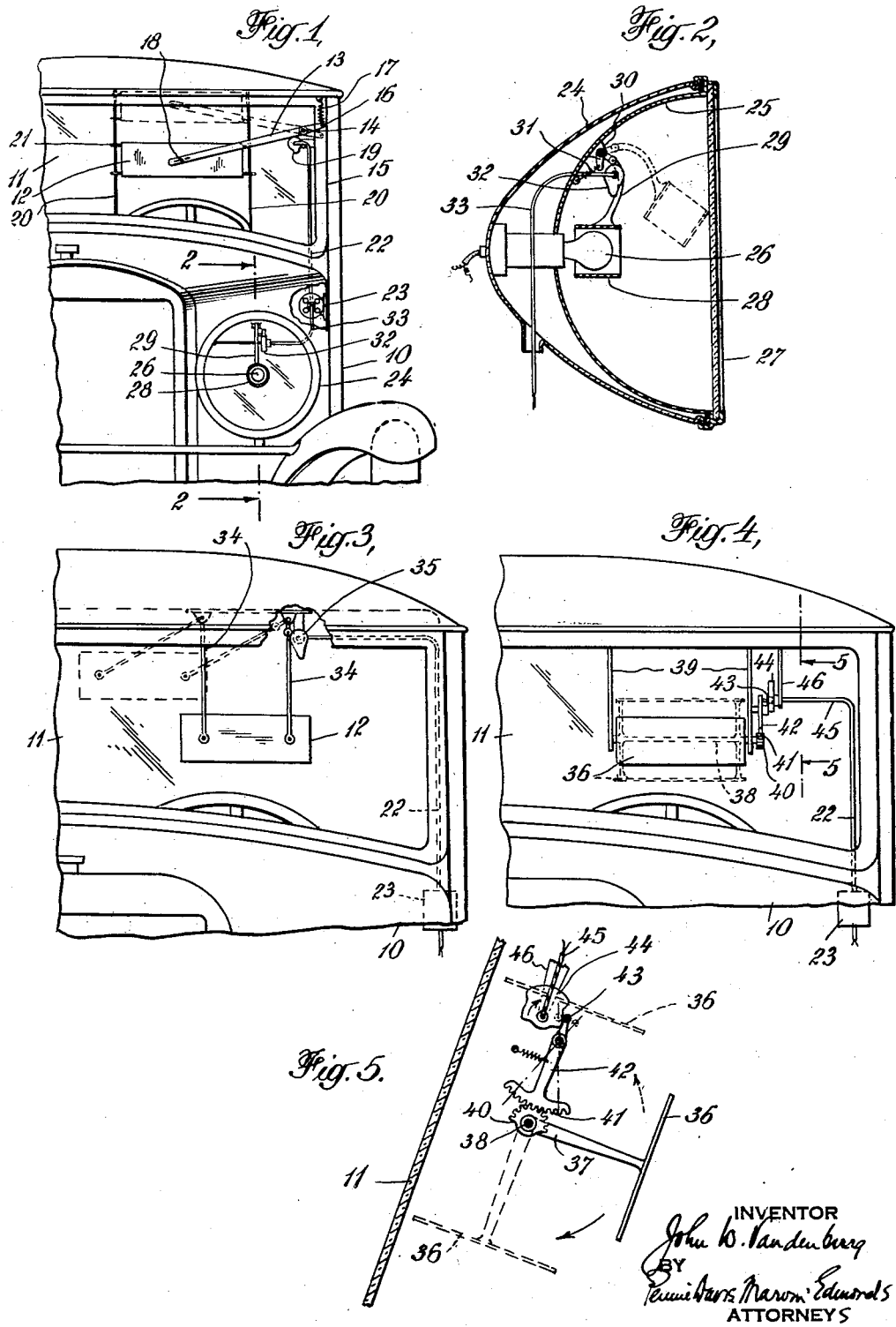

2,139,707

UNITED STATES PATENT OFFICE 2,139,707

HEADLIGHT SYSTEM

John W. Van Denburg, White Plains, N. Y.

Application February 27, 1936, Serial No. 66,034

2 Claims. (Cl. 240—45)

This invention relates to headlight systems for vehicles, such as motor cars, locomotives, etc., and is concerned more particularly with a novel system of the type referred to, which provides the driver of the vehicle equipped with it with proper illumination of the roadway ahead of him, and at the same time affords him protection against the glare of headlights on approaching vehicles. While the system of the invention is of general application to vehicles, it may be employed to particular advantage on motor cars. An embodiment of the invention adapted for that use will, accordingly, be described in detail for purposes of explanation of the principles of the invention, but it is to be understood that its utility is not limited to vehicles of any specific type.

At the present time, the laws of many States require that the headlights of motor cars be equipped with dimmer or diffusing lenses of approved types and, while there are available a number of such lenses which include prisms and other similar expedients, they do not completely prevent the headlights with which they are used from throwing glaring beams which are both trying to the drivers of approaching vehicles and likely to lead to accidents. Such lenses, therefore, do not provide a satisfactory solution of the problem of properly illuminating the roadway for the driver of one vehicle without annoying and impairing the vision of the drivers of approaching vehicles.

As a result of considerable study and experimentation in this field, I have found that the problem can be solved in a wholly different way and without attempting to limit, control, or alter the beams from the headlights of vehicles. Instead, I provide the driver of the vehicle equipped with my system with a moving screen or shield which intercepts and reduces the amount of light that reaches him from the approaching light source, and I insure that the roadway ahead of him will be sufficiently illuminated by employing headlights on the driver's own vehicle which are of greater than normal intensity and operate intermittently.

The moving screen of my system is actuated with a movement of reciprocation or rotation at a rapid rate and in such a way that for a considerable proportion of its operation, it cuts off the vision of the driver of the car equipped with it, thus wholly intercepting the light from approaching vehicles, and during the remainder, it is wholly outside his field of vision. The light source then employed in the system operates intermittently in synchronism with the screen and has an intensity greater than normal by an amount which depends on the proportion of the time during which the driver is blinded by the screen. Thus, for example, if the screen is so operated that it shuts off the vision of the driver for four-fifths of the time and he may see the field ahead for one-fifth of the time, the light source used is of preferably five times the intensity of that which would ordinarily be employed.

The screen, which eliminates the glare of approaching headlights, is operated rapidly enough not to impair the driver's persistence of vision, and since the light source operates in synchronism with the screen and is of increased intensity, the total light reaching the driver from the roadway may be the same as that which would reach him if a continuously operated light source of ordinary intensity were used. Also, since the light source is effective only a part of the time which is proportional to its intensity, the total light reaching the drivers of approaching vehicles may be the same as that which would issue from a normally intense source in continuous operation.

The mechanical features of the system, such as the screen, the light source, and the mechanism for operating them, may take various forms, and various embodiments of the principles of the invention are illustrated in the accompanying drawing. While those embodiments are preferred, it is to be understood that various other arrangements of the apparatus may be employed, if desired.

In the drawing, Fig. 1 is a partial front view of an automobile equipped with the new system;

Fig. 2 is a vertical sectional view through one of the headlights of the system on the line 2—2 of Fig. 1;

Fig. 3 is a partial front view of an automobile equipped with a different type of screen;

Fig. 4 is a view similar to Fig. 3 showing another modification of the screen; and Fig. 5 is a sectional view on the line 5—5 of Fig. 4.

Referring to the drawing, the automobile 10 is provided with the usual windshield 11 and a screen 12 of any suitable opaque or substantially opaque material is mounted, preferably within the car, in front of the driver's seat. This screen is of sufficient size so that when it is at rest in front of the eyes of the driver, it completely cuts off his field of vision ahead and thus protects him from the glare of approaching headlights, and it is movable from that position to another in which it is wholly outside his field of vision ahead.

The screen may be supported and operated as described in any desired manner and by any suitable means. In the construction shown in Fig. 1, the means employed includes a lever 13 pivoted at 14 on a bracket or the like attached to any suitable part of the vehicle structure, such as the post 15. The lever 13 has a short arm 16 acted on by a spring 17 tending to swing the lever counter-clockwise, as illustrated, and the long arm of the lever is connected to the screen by a slot and pin connection 18. A cam 19 supported suitably on the post 15 engages the under side of the lever near its pivot and, as the cam rotates, it swings the lever to move the screen upward to the position shown in dotted lines, in which the screen is outside the range of vision of the driver. The screen is guided in its movements by vertical wire guides 20 passing through eyes 21 attached to the edges of the screen. The cam 19 is rotated by a flexible shaft 22 operated by any suitable means, such as an electric motor 23, which may be mounted under the hood of the car. The cam is of such contour that the screen remains in front of the eyes of the driver for the greater part, such as four-fifths, of the time of a single rotation of the cam, and is then moved rapidly out of his line of vision, remaining there during the remainder of the time of rotation. It then returns rapidly to effective position, and the cycle is repeated.

The length of each period during which the screen is effective depends on the rate of rotation of the cam, and while this rate may be varied somewhat, each period of effectiveness of the screen is less than the length of time during which vision persists. Thus, while the screen is out of the way, the driver sees the roadway ahead wholly without interference, and when the screen is before him, the image persists until the roadway is again visible.

The headlights employed in the new system are generally of usual construction, as shown in Fig. 2, and include a casing 24 with a reflector 25 and lamp 26. The front of the casing is closed by a lens 27 which may be of any desired sort, such as of an approved diffusing type. The lamp bulb 26 is of greater candle power than is normally employed and its power depends on and is directly related to the timing of the screen. The power of the bulb is such that the total light returned to the driver from the roadway is the same as if the screen were not in use, and, thus, for example, if the screen permits the driver to see the roadway only a fifth of the time, the bulb has five times the power of a bulb that would ordinarily be used in a headlight of the same size and for the same purpose.

The headlight illuminates the roadway intermittently and in synchronism with the operation of the screen, so that when the roadway is visible, the full beam from the headlight strikes it. Such intermittent illumination may be provided in various ways, but I prefer to provide a shield for the light source which is intermittently effective, and such a shield may take the form of a tubular member 28 mounted on a lever 29 pivoted on a bracket 30 suitably mounted inside the casing 24. A spring 31 acting on the short arm of the lever tends to move the member 28 to a position in which it encloses the bulb 26, and the lever is moved to swing the member to its ineffective position, shown in dotted lines, by a cam 32 on a flexible shaft 33 leading from the motor 23 and to the other headlight (not shown).

The tubular member may be open at both ends or have its outer end closed, but in either condition, it is effective, when enclosing the bulb 26, either to reduce the power of the beam issuing from the headlight to a substantial extent or to shut it off almost entirely. The cam 32 is of such shape and is so driven that the member shuts off or reduces the light emitted throughout the same periods that the screen 12 is effective to cut off the vision of the driver.

With the construction described, the driver receives only a small part of the light issuing from the headlights of approaching cars, since the screen is in front of him for the greater part of the time. His own headlights, nevertheless, give him the desired illumination of the roadway, since, although they are in operation only a fraction of the time, their power is inversely proportional to the reduction in their total effective time and the total light reflected to him is thus the same as that provided by an ordinary headlight operating continuously. Approaching drivers are not blinded by such intense headlights, because, being effective only a part of the time, the total light emitted by them is the same as that of a continuously operating headlight of ordinary power.

Instead of employing a screen, as shown in Fig. 1, which moves up out of the line of vision, the screen may move downward. The operating mechanism is the same as that illustrated, its mounting being lower. An alternative construction of the screen is shown in Fig. 3 in which the screen is mounted on parallel levers 34 pivoted on a suitable part of the car body and swung either to right or left by a cam 35 similar to cam 19 and similarly operated.

As a further modification, shown in Figs. 4 and 5, the screen 36 is mounted on arms 37 on a shaft 38 pivotally mounted in arms 39 depending from the top of the car. The shaft carries a sector gear 40 meshing with a similar gear 41 on one end of a lever 42 pivoted on one of the arms 39. At the other end, the lever carries a roller 43 engaging a cam 44 mounted on a flexible shaft 45, supported near the cam by an arm 46 attached to the car body.

With the construction shown in Figs. 4 and 5, the screen swings from its effective position shown in full lines to the upper dotted line position, for example. It then returns to effective position, and then moves to the lower dotted line position. Upon its return to effective position, the cycle of operations is repeated.

All forms of the apparatus shown give the desired results, and it will be obvious that numerous mechanical changes in the apparatus may be made without losing the advantages of the invention. Also, while I have described the light source of the system as being of an intensity which is increased in the same proportion as its effective time is decreased, it is to be understood that this represents the ideal condition. Thus, if the screen is so operated as to cut off the driver's field of vision for four-fifths of the time, the use of a light source of five times normal intensity will provide the driver with the same illumination of the roadway ahead of him that would be provided by a light source of normal intensity operating continuously. However, it is not necessary that the increase over normal of the intensity of the light source of the new system should be exactly inversely proportional to the reduction of the time in which the driver's vision is not cut off. Any increase in the intensity of the light source above normal is helpful, and an inversely proportional increase is preferred.

I claim:

1. In a lighting system for vehicles, the combination of a screen mounted on the vehicle in front of the driver and movable so that it intermittently screens his view in a forward direction and protects his eyes from the glare of headlights on approaching vehicles, said view being unobstructed by the screen when the latter is in one position, a headlight on the vehicle containing a source of light, means for intermittently reducing the amount of light from said source striking the driver's forward field of vision, and means for operating the screen and light-reducing means in synchronism and actuating the light-reducing means to permit the full amount of light from the source to strike said field only when the screen is out of screening position, said operating means maintaining said screen in screening position and rendering said light-reducing means effective for the greater part of each cycle of operation thereof, said source of light being of an intensity such that said field of vision is effectively illuminated for the driver, substantially as described, despite the action of the screen and light-reducing means and said part of each cycle of operations being shorter than the period of persistence of vision.

2. In a lighting system for vehicles, the combination of a screen mounted on the vehicle in front of the driver and movable to and from a position in which it screens his view in a forward direction and protects his eyes from the glare of headlights on approaching vehicles, said view being wholly unobstructed by the screen when the latter is out of said position, a headlight on the vehicle containing a source of light, shielding means for intermittently reducing the amount of light from said source striking the driver's forward field of vision, and means including cams for operating the screen and shielding means in synchronism and causing the shielding means to permit the full amount of light from the source to strike said field only when the screen is out of screening position, said cams being formed to maintain the screen in screening position and to render said shielding means effective for the greater part of each cycle of operation thereof.

JOHN W. VAN DENBURG.